US012712807B2

(12) United States Patent
Wang et al.

(10) Patent No.: US 12,712,807 B2
(45) Date of Patent: Aug. 18, 2026

(54) INFORMATION FLOODING METHOD AND DEVICE

(71) Applicant: HUAWEI TECHNOLOGIES CO., LTD., Shenzhen (CN)

(72) Inventors: Yali Wang, Beijing (CN); Zhibo Hu, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 468 days.

(21) Appl. No.: 18/356,407

(22) Filed: Jul. 21, 2023

(65) Prior Publication Data

US 2023/0362089 A1 Nov. 9, 2023

Related U.S. Application Data

(63) Continuation of application No. PCT/CN2021/112683, filed on Aug. 16, 2021.

(30) Foreign Application Priority Data

Jan. 26, 2021 (CN) ........................ 202110102938.4
Feb. 19, 2021 (CN) ........................ 202110189742.3

(51) Int. Cl.
*H04L 45/00* (2022.01)
*H04L 45/02* (2022.01)
*H04L 45/122* (2022.01)

(52) U.S. Cl.
CPC .............. *H04L 45/32* (2013.01); *H04L 45/04* (2013.01); *H04L 45/122* (2013.01)

(58) Field of Classification Search
None
See application file for complete search history.

(56) References Cited

U.S. PATENT DOCUMENTS

2007/0255812 A1* 11/2007 Mirtorabi .............. H04L 45/026 709/220
2008/0056157 A1* 3/2008 Retana .................... H04L 45/04 370/254

FOREIGN PATENT DOCUMENTS

CN 110099002 A 8/2019

OTHER PUBLICATIONS

Lindem et al., "OSPF Transport Instance Extensions draft-acee-lsr-ospf-transport-instance-01", LSR Workgroup, IETF Trust, Nov. 2, 2020, 9 pages.

(Continued)

*Primary Examiner* — Anh Ngoc M Nguyen
(74) *Attorney, Agent, or Firm* — Maier & Maier, PLLC

(57) ABSTRACT

An information flooding method and a device, to flexibly manage flooding information of an interior gateway protocol (IGP) instance, adapt to flooding requirements in different scenarios, improve flooding efficiency, save network resources, and improve flooding information processing efficiency. The method includes: a first network device obtains a flooding information set, where the flooding information set includes flooding information corresponding to each of a plurality of flooding instances, and the plurality of flooding instances belong to one IGP instance. The first network device sends a plurality of packets, where each of the plurality of packets carries a corresponding flooding instance identifier and corresponding flooding information, and the flooding instance identifier is used to identify a flooding instance.

19 Claims, 15 Drawing Sheets

(56) References Cited

OTHER PUBLICATIONS

Callon, "Use of OSI IS-IS for Routing in TCP/IP and Dual Environments", Network Working Working Group, Dec. 1990, 85 pages.
Psenak et al., "Multi-Topology (MT) Routing in OSPF", Network Working Group, The IETF Trust, Jun. 2007, 20 pages.
Przygienda et al., "M-ISIS: Multi Topology (MT) Routing in Intermediate System to Intermediate Systems (IS-ISs)", Network Working Group, The IETF Trust, Feb. 2008, 14 pages.
Coltun et al., "OSPF for IPV6", Network Working Group, The IETF Trust, Jul. 2008, 94 pages.
Lindem et al., "OSPFv2 Multi-Instance Extensions", Internet Engineering Task Force (IETF), IETF Trust, ISSN: 2070-1721, Mar. 2012, 9 pages.
Previdi et al., "IS-IS Multi-Instance", Internet Engineering Task Force (IETF), IETF Trust, ISSN: 2070-1721, Dec. 2012, 14 pages.
Ginsberg et al., "Advertising Generic Information in IS-IS", Internet Engineering Task Force (IETF), IETF Trust, ISSN: 2070-1721, Dec. 2010, 11 pages.
Moy, "OSPF Version 2", Network Working Group, RFC 1247, Jul. 1991, 129 pages.
"Information Technology—Telecommunications and Information Exchange Between Systems—Intermediate System to Intermediate System Intra-Domain Routeing Information Exchange Protocol for Use in Conjunction with the Protocol for Providing the Connectionless-Mode Network Service (ISO 8473)", International Standard, ISO/IEC 10589:2002(E), Nov. 15, 2002, Second Edition, 210 pages.
"OSI Model", Wikipedia, Dec. 17, 2001, 9 pages.

* cited by examiner

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Remaining Lifetime | | | | 2 |
| LSP ID | | | | ID Length + 2 |
| Sequence Number | | | | 4 |
| Checksum | | | | 2 |
| P | ATT | LSPDBOL | IS Type | 1 |
| VARIABLE LENGTH FIELDS | | | | VARIABLE |

FIG. 5

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Source ID | | | | ID Length + 1 |
| Start LSP ID | | | | ID Length + 2 |
| End LSP ID | | | | ID Length + 2 |
| VARIABLE LENGTH FIELDS | | | | VARIABLE |

FIG. 6

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Source ID | | | | ID Length + 1 |
| VARIABLE LENGTH FIELDS | | | | VARIABLE |

FIG. 7

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Remaining Lifetime | | | | 2 |
| LSP ID | | | | ID Length + 2 |
| Sequence Number | | | | 4 |
| Checksum | | | | 2 |
| P | ATT | LSPDBOL | IS Type | 1 |
| VARIABLE LENGTH FIELDS | | | | VARIABLE |

| LSP ID |
|---|
| Source ID |
| Pseudonode ID |
| LSP Number |
| MFI-ID |

FIG. 8

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Source ID | | | | ID Length + 1 |
| Start LSP ID | | | | ID Length + 2 |
| End LSP ID | | | | ID Length + 2 |
| VARIABLE LENGTH FIELDS | | | | VARIABLE |

MFI-ID

FIG. 9

| Data field | | | | Quantity of bytes |
|---|---|---|---|---|
| Intradomain Routeing Protocol Discriminator | | | | 1 |
| Length Indicator | | | | 1 |
| Version/Protocol ID Extension | | | | 1 |
| ID Length | | | | 1 |
| R | R | R | PDU Type | 1 |
| Version | | | | 1 |
| Reserved | | | | 1 |
| Maximum Area Addresses | | | | 1 |
| PDU Length | | | | 2 |
| Source ID | | | | ID Length + 1 |
| VARIABLE LENGTH FIELDS | | | | VARIABLE |

MFI-ID

FIG. 10

The OSPF Database Description Packet

The OSPF Link State Request Packet

The OSPF Link State Update Packet

The OSPF Link State Acknowledgment Packet

INFORMATION FLOODING METHOD AND DEVICE

CROSS-REFERENCE TO RELATED APPLICATIONS

This application is a continuation of International Application No. PCT/CN2021/112683, filed on Aug. 16, 2021, which claims priority to Chinese Patent Application No. 202110189742.3, filed on Feb. 19, 2021, and Chinese Patent Application No. 202110102938.4, filed on Jan. 26, 2021. All of the aforementioned patent applications are hereby incorporated by reference in their entireties.

TECHNICAL FIELD

The embodiments relate to the communication field and to an information flooding method and a device.

BACKGROUND

The interior gateway protocol (IGP) is a protocol for flooding information between network devices in an autonomous system (AS). In a conventional information flooding method, all flooding information of an IGP routing protocol instance (IGP instance) is flooded as a whole. This flooding method is rigid and affects flooding efficiency.

SUMMARY

Embodiments provide an information flooding method and a device, to improve flooding efficiency.

According to a first aspect, an information flooding method is provided. The method may be applied to a first network device, and includes the following steps: the first network device obtains a flooding information set, where the flooding information set includes flooding information corresponding to each of a plurality of flooding instances, the plurality of flooding instances belong to one IGP instance, and the IGP instance may be, for example, an IGP instance 0. The first network device sends a plurality of packets to one or more network devices, where each of the plurality of packets carries a corresponding flooding instance identifier and corresponding flooding information, and the flooding instance identifier is used to identify a flooding instance. That is, the first network device divides one IGP instance into a plurality of flooding instances, and sends, through a plurality of packets, flooding information corresponding to the plurality of flooding instances. Compared with a conventional solution in which flooding information of one IGP instance is sent as a whole, in this embodiment, the flooding information of the one IGP instance can be flexibly managed, to adapt to flooding requirements in different scenarios, improve flooding efficiency, save network resources, and improve flooding information processing efficiency.

In this embodiment, the flooding information carried in the plurality of packets may include routing information and non-routing information. The following separately provides descriptions.

In a possible implementation, the plurality of flooding instances include a first flooding instance, and flooding information of the first flooding instance includes routing information. The routing information may include one or more of the following: a prefix, traffic engineering (TE) information, device capability information, link information, and the like.

Correspondingly, that the first network device sends a plurality of packets includes: the first network device sends a first packet to a second network device, where the first packet includes a first flooding instance identifier and the routing information, and the second network device is any neighboring network device of the first network device. That is, the first network device may flood routing information and a corresponding flooding instance identifier to a neighboring device of the first network device. Optionally, the first network device may perform flooding to all neighboring devices.

In a possible implementation, the plurality of flooding instances include a second flooding instance, and flooding information of the second flooding instance includes non-routing information. The non-routing information includes one or more of the following: application program information, device capability information, slice information, and the like.

Correspondingly, that the first network device sends a plurality of packets includes: the first network device sends a second packet to a second network device, where the second packet includes a second flooding instance identifier and the non-routing information. That is, the first network device may flood non-routing information and a corresponding flooding instance identifier. Optionally, the second network device is a next-hop network device in a shortest path tree (SPT) of the first network device, and the shortest path tree is a shortest path from the first network device as a root node to another network device in a network topology. That is, the first network device may flood the non-routing information based on the shortest path tree, to save network resources.

In a possible implementation, the shortest path tree of the first network device may be generated based on flooding information of a first flooding instance, and the flooding information of the first flooding instance includes routing information. The flooding information of the first flooding instance may include routing information of the first network device, or may include routing information that comes from another network device. A flooding instance corresponding to the flooding information of the first flooding instance is the same as a flooding instance corresponding to flooding information of the another network device.

For example, the first network device receives a third packet from the second network device, where the third packet includes flooding information of a first flooding instance of the second network device, and the flooding information of the first flooding instance of the second network device includes routing information of the second network device. In this case, the first network device may generate the shortest path tree based on the flooding information of the first flooding instance of the second network device.

In a possible implementation, before the first network device sends the plurality of packets to the second network device, the first network device may send a hello packet to the second network device, where the hello packet is used to establish a neighbor relationship between the first network device and the second network device. The first network device sends the plurality of packets to the second network device based on the neighbor relationship. It should be noted that the first network device may establish a neighbor relationship with the second network device, to send, to the second network device, a plurality of packets that carry flooding information of different flooding instances.

In a possible implementation, each of the plurality of flooding instances has a corresponding flooding parameter, and the flooding parameter is used to send a packet of a corresponding flooding instance. The flooding parameter includes one or more of the following: a maximum age, a maximum LSP generation interval, a minimum LSP generation interval, a minimum LSP transmission interval, a CSNP transmission interval, a PSNP transmission interval, a retransmission interval, a refresh timer, and the like. That is, flooding information of a plurality of flooding instances that belong to one IGP instance may be flooded based on different flooding parameters, to implement resource isolation.

In a possible implementation, each of the plurality of flooding instances has a corresponding priority, and the priority corresponds to the flooding parameter.

In a possible implementation, the first network device may send a plurality of packets through different processes. For example, flooding information of a plurality of flooding instances that belong to one IGP instance is sent by using a plurality of different processes, to improve flooding efficiency.

In a possible implementation, the packet includes an intermediate system-to-intermediate system (ISIS) packet or an open shortest path first (OSPF) packet.

The ISIS packet includes one or more of the following: a link state protocol data unit (LSP) packet, a partial sequence number packet (PSNP), and a complete sequence number packet (CSNP). The OSPF packet includes one or more of the following: a database description (DD) packet, a link state request (LSR) packet, a link state update (LSU) packet, and a link state acknowledgment (LSAck) packet.

The flooding instance identifier may be carried in the ISIS packet or the OSPF packet in a format of a type length value (TLV) field. For example, the TLV field may be carried in variable length fields of the ISIS packet, or the flooding instance identifier is carried in a packet header or a data part of the OSPF packet. In a possible implementation, the flooding instance identifier is carried in a first TLV field of the variable length fields, to determine a flooding instance corresponding to the packet as soon as possible, and improve packet processing efficiency.

Alternatively, the flooding instance identifier is carried in an LSP identifier (ID) ID field of the LSP, to obtain a new type of LSP.

In a possible implementation, the packet may further include indication information, and the indication information indicates that the packet includes the flooding instance identifier. Optionally, the indication information is carried in a protocol data unit (PDU) type field of the ISIS packet. For example, a new type of ISIS packet is provided, and the ISIS packet is an ISIS packet carrying a flooding instance identifier.

In a possible implementation, the first packet of the plurality of packets further carries a flooding topology identifier, and the flooding topology identifier is used to identify a network topology in which flooding information in the first packet is flooded, so that the plurality of packets can be flooded in a corresponding network topology, to implement on-demand flooding and save network resources.

According to a second aspect, an information flooding method is provided. The method may be applied to a second network device. For example, the method includes: the second network device receives a plurality of packets from a first network device, where each of the plurality of packets carries a flooding instance identifier and flooding information that correspond to the packet, a plurality of flooding instances corresponding to the plurality of packets belong to one IGP instance, and the IGP instance may be, for example, an IGP instance 0. After receiving the plurality of packets, the second network device stores the flooding information corresponding to the flooding instance identifier. One IGP instance is divided into a plurality of flooding instances, and flooding information corresponding to the plurality of flooding instances is carried in a plurality of packets. Compared with a conventional solution in which flooding information of one IGP instance is sent as a whole, in this embodiment, the flooding information of the one IGP instance can be flexibly managed, to adapt to flooding requirements in different scenarios, improve flooding efficiency, save network resources, and improve flooding information processing efficiency.

In a possible implementation, that the second network device stores the flooding information corresponding to the flooding instance identifier includes: The second network device updates, based on the flooding information, a link state database (LSDB) corresponding to the flooding instance identifier. Optionally, different flooding instance identifiers correspond to different processes, and the second network device may receive and update a plurality of packets through a plurality of different processes, to improve packet processing efficiency.

For example, the second network device updates, through an update process corresponding to the flooding instance identifier, the flooding information into a link state database corresponding to the update process.

As described above, the flooding information carried in the plurality of packets may include routing information and non-routing information. The following separately describes two types of packets.

In a possible implementation, the plurality of packets include a first packet, the first packet includes a first flooding instance identifier and first flooding information, and the first flooding information includes routing information. For a type of the routing information, refer to the foregoing descriptions. Details are not described herein again.

The method further includes: the second network device sends the first packet to a third network device, where the third network device is any neighboring network device of the second network device other than the first network device. That is, the second network device may flood the routing information to all neighboring devices other than the first network device.

In a possible implementation, the plurality of packets include a second packet, the second packet includes a second flooding instance identifier and second flooding information, and the second flooding information includes non-routing information. For a type of the non-routing information, refer to the foregoing descriptions. Details are not described herein again.

The method further includes: the second network device sends the second packet to a third network device. In a possible implementation, the third network device is a next-hop network device in a shortest path tree of the second network device, and the shortest path tree is a shortest path from the second network device as a root node to another network device in a network topology. That is, the second network device may flood the non-routing information based on the shortest path tree, to save network resources.

Optionally, the shortest path tree of the second network device is generated based on flooding information corresponding to a first flooding instance identifier, and the flooding information corresponding to the first flooding instance identifier includes routing information. The flooding information of the first flooding instance may include routing information of the second network device, or may include routing information that comes from another network device, including routing information of the third network device. The first flooding instance may be a flooding instance carrying routing information.

In a possible implementation, the plurality of packets include a first packet, the first packet carries a flooding topology identifier of a corresponding flooding instance, and the flooding topology identifier is used to identify a network topology in which flooding information in the first packet is flooded. The method further includes: the second network device determines a next-hop network device based on the flooding topology identifier, and sends the first packet to the next-hop network device, to implement on-demand flooding and save network resources.

In a possible implementation, that the second network device receives a plurality of packets from a first network device includes: The second network device receives a hello packet from the first network device, and establishes a neighbor relationship with the first network device based on the hello packet; and the second network device receives the plurality of packets from the first network device based on the neighbor relationship. It should be noted that the first network device may establish a neighbor relationship with the second network device, to send, to the second network device, a plurality of packets that carry flooding information of different flooding instances.

According to a third aspect, a method is provided. The method is applied to a first network device. The first network device creates different flooding instances based on one IGP instance, and the first network device sends different flooding information by using the different flooding instances. For the flooding information, refer to the foregoing embodiment.

According to a fourth aspect, a network device is provided. The network device is applied to a network system including a plurality of network devices. The plurality of network devices include a first network device. The network device is the first network device. The network device includes: a processing unit, configured to obtain a flooding information set, where the flooding information set includes flooding information corresponding to each of a plurality of flooding instances, and the plurality of flooding instances belong to one interior gateway protocol IGP instance; and a sending unit, configured to send a plurality of packets, where each of the plurality of packets carries a corresponding flooding instance identifier and corresponding flooding information, and the flooding instance identifier is used to identify a flooding instance.

In a possible implementation, the plurality of flooding instances include a first flooding instance, and flooding information of the first flooding instance includes routing information; and the sending unit is configured to send a first packet to a second network device, where the first packet includes a first flooding instance identifier and the routing information, and the second network device is any neighboring network device of the first network device.

In a possible implementation, the plurality of flooding instances include a second flooding instance, and flooding information of the second flooding instance includes non-routing information; and the sending unit is configured to send a second packet to a second network device, where the second packet includes a second flooding instance identifier and the non-routing information.

In a possible implementation, the second network device is a next-hop network device in a shortest path tree of the first network device, and the shortest path tree is a shortest path from the first network device as a root node to another network device in a network topology.

In a possible implementation, the shortest path tree of the first network device is generated based on flooding information of a first flooding instance, and the flooding information of the first flooding instance includes routing information.

In a possible implementation, the network device further includes: a receiving unit, configured to receive a third packet from the second network device, where the third packet includes flooding information of a first flooding instance of the second network device, and the flooding information of the first flooding instance of the second network device includes routing information of the second network device. The processing unit is further configured to generate the shortest path tree based on the flooding information of the first flooding instance of the second network device.

In a possible implementation, the sending unit is configured to send a hello packet to the second network device, where the hello packet is used to establish a neighbor relationship between the first network device and the second network device; and the sending unit is configured to send the plurality of packets to the second network device.

In a possible implementation, each of the plurality of flooding instances has a corresponding flooding parameter, and the flooding parameter is used to send a packet of a corresponding flooding instance.

In a possible implementation, each of the plurality of flooding instances has a corresponding priority, and the priority corresponds to the flooding parameter.

In a possible implementation, the packet includes an intermediate system-to-intermediate system ISIS packet or an open shortest path first OSPF packet.

In a possible implementation, the first packet of the plurality of packets further carries a flooding topology identifier, and the flooding topology identifier is used to identify a network topology in which flooding information in the first packet is flooded.

According to a fifth aspect, a network device is provided. The network device is applied to a network system including a plurality of devices. The plurality of network devices include a first network device and a second network device. The network device is the second network device. The network device includes: a receiving unit, configured to receive a plurality of packets from the first network device, where each of the plurality of packets carries a flooding instance identifier and flooding information that correspond to the packet, and a plurality of flooding instances corresponding to the plurality of packets belong to one interior gateway protocol IGP instance; and a storage unit, configured to store the flooding information corresponding to the flooding instance identifier.

In a possible implementation, the storage unit is configured to update, based on the flooding information, a link state database corresponding to the flooding instance identifier.

In a possible implementation, the storage unit is configured to update, through an update process corresponding to the flooding instance identifier, the flooding information into a link state database corresponding to the update process.

In a possible implementation, the plurality of packets include a first packet, the first packet includes a first flooding instance identifier and first flooding information, and the first flooding information includes routing information.

The network device further includes: a sending unit configured to send the first packet to a third network device, where the third network device is any neighboring network device of the second network device other than the first network device.

In a possible implementation, the plurality of packets include a second packet, the second packet includes a second flooding instance identifier and second flooding information, and the second flooding information includes non-routing information.

The network device further includes: a sending unit, configured to send the second packet to a third network device.

In a possible implementation, the third network device is a next-hop network device in a shortest path tree of the second network device, and the shortest path tree is a shortest path from the second network device as a root node to another network device in a network topology.

In a possible implementation, the plurality of packets include a first packet, the first packet carries a flooding topology identifier of a corresponding flooding instance, and the flooding topology identifier is used to identify a network topology in which flooding information in the first packet is flooded.

The processing unit is further configured to determine a next-hop network device based on the flooding topology identifier.

The network device further includes: a sending unit, configured to send the first packet to the next-hop network device.

In a possible implementation, the receiving unit is further configured to receive a hello packet from the first network device, and establish a neighbor relationship with the first network device based on the hello packet; and the receiving unit is configured to receive the plurality of packets from the first network device based on the neighbor relationship.

In a possible implementation, the packet includes an intermediate system-to-intermediate system ISIS packet or an open shortest path first OSPF packet.

According to a sixth aspect, a network device is provided. The device is applied to a network system including a plurality of network devices. The plurality of network devices include a first network device and a second network device. The network device is the first network device. The first network device includes a processor and a network interface. The network interface is configured to receive and send a packet. The processor is configured to perform the method according to any one of the first aspect or the possible implementations of the first aspect, or perform the method according to any one of the third aspect or the possible implementations of the third aspect.

In a possible implementation, the first network device further includes a memory, and the memory may be configured to store instructions or program code. The processor is configured to invoke the instructions or the program code in the memory to perform the method according to any one of the first aspect or the possible implementations of the first aspect, or perform the method according to any one of the third aspect or the possible implementations of the third aspect.

According to a seventh aspect, a network device is provided. The network device is applied to a network system including a plurality of network devices. The plurality of network devices include a first network device and a second network device. The network device is the second network device. The second network device includes a processor and a network interface. The network interface is configured to receive and send a packet. The processor is configured to perform the method according to any one of the second aspect or the possible implementations of the second aspect.

In a possible implementation, the second network device further includes a memory, and the memory may be configured to store instructions or program code. The processor is configured to invoke the instructions or the program code in the memory to perform the method according to any one of the second aspect or the possible implementations of the second aspect.

According to an eighth aspect, a network system is provided. The network system includes the first network device according to the fourth aspect and the second network device according to the fifth aspect, or includes the first network device according to the sixth aspect or the second network device according to the seventh aspect.

According to a ninth aspect, a computer-readable storage medium is provided, including instructions, a program, or code. When the instructions, the program, or the code is executed on a computer, the computer is enabled to perform the method according to any one of the possible implementations of the first aspect, the second aspect, or the third aspect.

According to a tenth aspect, a computer program product including computer instructions is provided. When the computer program product runs on a network device, the network device is enabled to perform the method according to any one of the possible implementations of the first aspect, the second aspect, or the third aspect.

According to an eleventh aspect, a chip is provided, including a memory and a processor. The memory is configured to store instructions or program code. The processor is configured to invoke the instructions or the program code from the memory and run the instructions or the program code, to perform the method according to any one of the first aspect or the possible implementations of the first aspect; or the processor performs the method according to any one of the second aspect or the possible implementations of the second aspect; or the processor performs the method according to the third aspect.

According to a twelfth aspect, a chip is provided. The chip includes a processor but does not include a memory. The processor is configured to read instructions or program code stored in a memory outside the chip, and execute the instructions or the program code. When the instructions or the program code is executed, the processor performs the method according to any one of the first aspect or the possible implementations of the first aspect; or the processor performs the method according to any one of the second aspect or the possible implementations of the second aspect; or the processor performs the method according to the third aspect.

BRIEF DESCRIPTION OF DRAWINGS

FIG. 5 is a schematic diagram of a format of an LSP according to an embodiment;

FIG. 6 is a schematic diagram of a format of a PSNP according to an embodiment;

FIG. 7 is a schematic diagram of a format of a CSNP according to an embodiment;

FIG. 8 is a schematic diagram of a format of an LSP including an MFI-ID field according to an embodiment;

FIG. 9 is a schematic diagram of a format of a PSNP including an MFI-ID field according to an embodiment;

FIG. 10 is a schematic diagram of a format of a CSNP including an MFI-ID field according to an embodiment;

DETAILED DESCRIPTION OF EMBODIMENTS

Embodiments provide an information flooding method and a device, to resolve a conventional problem that flooding efficiency is low because all flooding information of an IGP instance is flooded as a whole.

The information flooding method provided in embodiments may be applied to an ISIS network architecture, or may be applied to an open shortest path first OSPF network architecture.

ISIS is a dynamic routing protocol initially designed by the International Organization for Standardization (ISO) for its connectionless network protocol (CLNP). The ISIS is a link state protocol used within an autonomous system, and uses a shortest path first (SPF) algorithm for route calculation.

Figures 1, 2:
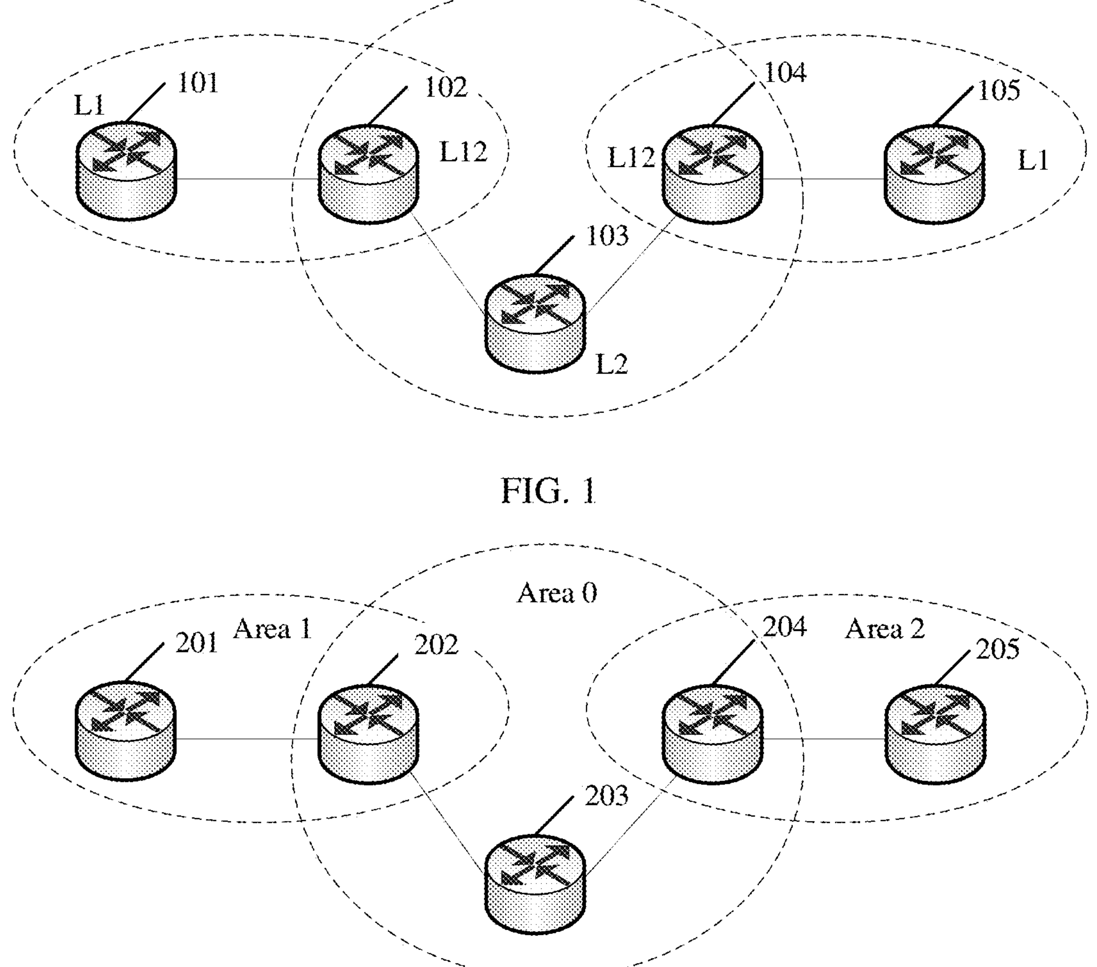
FIG. 1 is a schematic diagram of an ISIS network architecture according to an embodiment.
FIG. 2 is a schematic diagram of an OSPF network architecture according to an embodiment.

FIG. 1 is a schematic diagram of an ISIS network architecture. The network architecture includes a network device 101, a network device 102, a network device 103, a network device 104, and a network device 105. The network device 101 and the network device 105 belong to a non-backbone area, the network device 101 belongs to an area 1 of the non-backbone area, and the network device 105 belongs to an area 2 of the non-backbone area. The network device 102, the network device 103, and the network device 104 belong to a backbone area, and the network device 102 and the network device 104 are edge network devices of the backbone area. In the embodiments, a network device in a non-backbone area is referred to as a level 1 (L1) device, a non-edge network device in a backbone area is referred to as a level 2 (L2) device, and an edge network device in a backbone area is referred to as a level 1-2 (L12) device.

The information flooding method provided in the embodiments may be performed by a first network device. The first network device may be any one of the network device 101, the network device 102, the network device 103, the network device 104, and the network device 105 in FIG. 1.

OSPF is an IP protocol-based routing protocol for determining a route in a single AS, and is an implementation of a link state routing protocol. The OSPF supports load balancing and service type-based routing, and also supports a plurality of routing modes, such as host-specific routing and subnet routing.

FIG. 2 is a schematic diagram of an OSPF network architecture. The network architecture includes a network device 201, a network device 202, a network device 203, a network device 204, and a network device 205. The network device 203 is a network device in a backbone area (an area 0), the network device 201 and the network device 205 are network devices in a non-backbone area, the network device 201 belongs to an area 1, and the network device 205 belongs to an area 2. The network device 202 and the network device 204 are border network devices, and belong to both the backbone area and the non-backbone area.

The information flooding method provided in the embodiments may be performed by a first network device. The first network device may be any one of the network device 201, the network device 202, the network device 203, the network device 204, and the network device 205 in FIG. 2.

In addition, the network device 101, the network device 102, the network device 103, the network device 104, and the network device 105 in FIG. 1, and the network device 201, the network device 202, the network device 203, the network device 204, and the network device 205 in FIG. 2 may be, for example, physical devices that support a routing function, such as routers or switches, or may be servers on which virtual routers or virtual switches are deployed.

Figure 3:
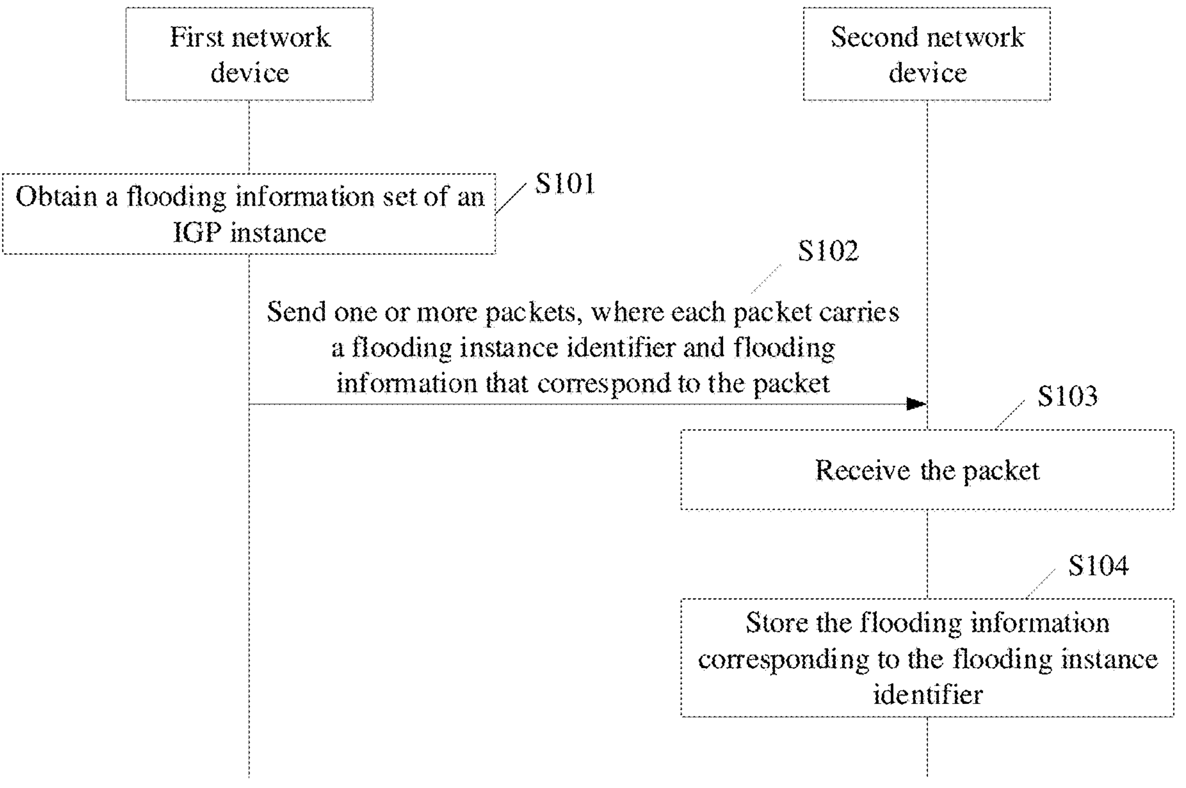
FIG. 3 is a flowchart of an information flooding method according to an embodiment.

FIG. 3 is a flowchart of an information flooding method according to an embodiment. The method includes the following steps.

S101: A first network device obtains a flooding information set of an IGP instance.

In this embodiment, a plurality of flooding instances are created based on one IGP instance, that is, the plurality of flooding instances belong to one level or area. The IGP instance may be, for example, an IGP instance 0. Each of the plurality of flooding instances has corresponding flooding information, and flooding information of the plurality of flooding instances constitutes the flooding information set.

Based on a type of the flooding information, the flooding information corresponding to the plurality of flooding instances may include routing information and non-routing information.

The routing information includes, for example, one or more of a prefix, traffic engineering (TE) information, device capability information, link information, and the like. The device capability information includes a capability of processing segment routing (SR) information, and the like. The link information includes link costs, bandwidth, and the like.

The non-routing information may include one or more of application program information, capability information indicating that a device supports some applications, slice information, and the like. The application program information may include information such as an identifier, a user name, and a password of an application program. The device capability information includes a capability of a network device to process an in-situ flow information telemetry (IFIT) packet, a processing capability of a central processing unit (CPU), a storage capability, and the like. The slice information is information about a network slice used by a network device to transmit a packet, for example, a slice identifier or resource requirement information corresponding to the slice. Different slices correspond to different network resource requirements, for example, high bandwidth, high reliability, or a low latency.

In this embodiment, different flooding instances correspond to different flooding information. A correspondence between a flooding instance and flooding information may be represented as a correspondence between a flooding instance identifier and the flooding information. The flooding instance identifier is used to identify the flooding instance. In this embodiment, the flooding instance identifier may also be referred to as a multi-flooding instance identifier (MFI-ID) or an instance-specific flooding identifier (IFID).

For example, the plurality of flooding instances include a flooding instance 0, a flooding instance 1, and a flooding instance 2. An identifier of the flooding instance 0 is an MFI-ID 0, an identifier of the flooding instance 1 is an MFI-ID 1, and an identifier of the flooding instance 2 is an MFI-ID 2. Flooding information corresponding to the flooding instance 0 may be the foregoing routing information, and flooding information corresponding to the flooding instance 1 and the flooding instance 2 may be the foregoing non-routing information.

In this embodiment, different flooding instances may have different flooding parameters. The flooding parameters may include, for example, one or more of a maximum age (MaxAge), a maximum LSP generation interval, a minimum LSP generation interval, a minimum LSP transmission interval, a CSNP transmission interval (Complete SNP Interval), a PSNP transmission interval (partial SNP Interval), a retransmission interval, a refresh timer, and the like. The maximum age is maximum time before an LSP is considered as expired. The maximum LSP generation interval is a maximum time interval at which two adjacent LSPs are generated. The minimum LSP generation interval is a minimum time interval at which two adjacent LSPs are generated. The minimum LSP transmission interval is a minimum time interval at which two adjacent LSPs are transmitted. The CSNP transmission interval is a time interval at which a device periodically sends CSNP packets on a broadcast link. The PSNP transmission interval is a time interval at which a device periodically sends PSNP packets on a broadcast link.

In this embodiment, the flooding information of the plurality of flooding instances may be sent by using a plurality of packets. The packets may be ISIS packets, OSPF packets, or the like.

The ISIS packets include a link state protocol data unit (LSP) packet, a partial sequence number packet (PSNP), and a complete sequence number packet (CSNP). The LSP packet includes link state information of a direct link of a network device, for example, an identifier of a neighboring network device, a link type, and link bandwidth. The PSNP includes digest information of some LSPs in a link state database (LSDB) of a network device, and is used to synchronize an LSDB corresponding to a carried flooding instance identifier. The CSNP includes digest information of all LSPs in an LSDB of a network device, and is used to synchronize an LSDB corresponding to a carried flooding instance identifier. The LSP packet may be generated and sent when a neighbor relationship between network devices is established or down, an interface of a network device is up or down, an introduced IP route changes, an inter-area IP route changes, an interface is assigned a new metric value, or the like, or may be sent periodically.

If the first network device is an L1 device, a packet type of the ISIS packet is an L1 ISIS packet. If the first network device is an L2 device, a packet type of the ISIS packet is an L2 ISIS packet. For example, an LSP packet sent by an L1 device is an L1 LSP packet, and an LSP packet sent by an L2 device is an L2 LSP packet.

The OSPF packets include a database description (DD) packet, a link state request (LSR) packet, a link state update (Link State Update, LSU) packet, and a link state acknowledgment (LSAck) packet. The DD packet is used to send a link state database digest. The LSR packet is used to request specific link state information. The LSU packet is used to send link state information. The LSAck packet is used to acknowledge receipt of a packet.

If the first network device is located in a backbone network area (an area 0), a packet type of the OSPF packet is a backbone network OSPF packet. If the first network device is located in a non-backbone network area (for example, an area 1 or an area 2), a packet type of the OSPF packet is a non-backbone network OSPF packet.

In this embodiment, flooding parameters of a same type of packets that carry different multi-flooding instances may be different. For example, a retransmission interval for a DD packet carrying an MFI-ID 0 is 5 seconds (s), and a retransmission interval for a DD packet carrying an MFI-ID 1 is 10 seconds. Flooding parameters corresponding to a same type of packets that carry a same flooding instance identifier are the same. Flooding parameters corresponding to different types of packets that carry a same flooding instance identifier may be different. For example, a transmission interval for a PSNP carrying an MFI-ID 0 is 2 s, and a transmission interval for a PSNP carrying an MFI-ID 1 is 20 s.

In addition, different flooding instances may have different priorities, and different priorities correspond to different flooding parameters.

Table 1 shows an example of a correspondence between a flooding instance identifier, flooding information, a flooding parameter, and a priority by using an ISIS packet as an example.

TABLE 1

| MFI-ID | Flooding information | Flooding parameter | Priority |
|---|---|---|---|
| MFI-ID 0 | Routing information | MaxAge: 1200 s<br>Maximum LSP generation interval: 900 s<br>Minimum LSP transmission interval: 5 s<br>PSNP transmission interval: 2 s<br>LSP transmission interval: 50 ms | High |
| MFI-ID 1 | Application program information, TE information, and slice information | MaxAge: 12000 s<br>Maximum LSP generation interval: 9000 s<br>Minimum LSP transmission interval: 60 s<br>PSNP transmission interval: 20 s<br>LSP transmission interval: 2 s | Medium |
| MFI-ID 2 | Device information | MaxAge: 12000 s<br>Maximum LSP generation interval: 9000 s<br>Minimum LSP transmission interval: 60 s<br>PSNP transmission interval: 20 s<br>LSP transmission interval: 2 s | Low |

S102: The first network device sends a plurality of packets.

In this embodiment, the first network device floods the flooding information of the plurality of flooding instances by sending the plurality of packets to another network device.

Each of the plurality of packets includes a flooding instance identifier and corresponding flooding information. In this embodiment, the flooding information may be carried in a data content part of the packet. There may be a plurality of implementations of a form in which the flooding instance identifier is carried in the packet. In addition, for different types of packets, locations of flooding instance identifiers carried in the packets are also different.

Figure 4:
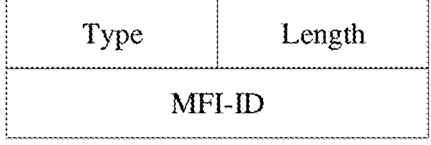
FIG. 4 is a schematic diagram of a format of a TLV carrying a flooding instance identifier according to an embodiment.

In a possible implementation, as shown in FIG. 4, the flooding instance identifier is carried in the packet in a format of a TLV. The TLV includes a type (T) field, a length (L) field, and a value (V) field. A value of the T field is used to indicate that the TLV is a TLV that carries a flooding instance identifier, a value of the L field is a length of the TLV, and the two fields each may occupy one octet. A value of the V field includes the flooding instance identifier. For example, the V field includes an MFI-ID field, and the flooding instance identifier may occupy two octets.

When the packet is an ISIS packet, the TLV carrying the flooding instance identifier may be carried in variable length fields of the ISIS packet, and may be a first TLV of the variable length fields. A subsequent TLV of the variable length fields may include flooding information corresponding to the flooding instance identifier in the first TLV.

FIG. 5 is a schematic diagram of a format of an LSP. In the figure, the LSP includes the following fields: an intra-domain routing protocol discriminator, a length indicator, a version/protocol ID extension, an ID length, a PDU type, a version, a reserved (R) bit, maximum area addresses, a PDU length, remaining lifetime, an LSP identifier (LSP ID), a sequence number, a checksum, a partition (P), an area attachment (ATT), LSDB overload (OL), an intermediate system type (IS Type), and variable length fields. For a quantity of bytes occupied by each field, refer to FIG. 4. Details are not described herein again. The TLV carrying the flooding instance identifier may be carried in the variable length fields field of the LSP in FIG. 1.

FIG. 6 is a schematic diagram of a format of a PSNP. In the figure, the PSNP includes the following fields: Intradomain Routing Protocol Discriminator, Length Indicator, Version/Protocol ID Extension, ID Length, PDU Type, R, Version, Reserved, Maximum Area Addresses, PDU Length, a source ID, and variable length fields. For a quantity of bytes occupied by each field, refer to FIG. 5. Details are not described herein again. The TLV carrying the flooding instance identifier may be carried in the variable length fields field of the PSNP in FIG. 5.

FIG. 7 is a schematic diagram of a format of a CSNP. In the figure, the CSNP includes the following fields: Intradomain Routing Protocol Discriminator, Length Indicator, Version/Protocol ID Extension, ID Length, PDU Type, R, Version, Reserved, Maximum Area Addresses, PDU Length, Source ID, a start LSP ID, an end LSP ID), and variable length fields. For a quantity of bytes occupied by each field, refer to FIG. 6. Details are not described herein again. The TLV carrying the flooding instance identifier may be carried in the variable length fields field of the CSNP in FIG. 6.

When the packet is an OSPF packet, the TLV carrying the flooding instance identifier may be carried in a data part of the OSPF packet. In addition to the flooding instance identifier, the data content part may further include flooding information corresponding to the flooding instance identifier.

In another possible implementation, a field whose value includes the flooding instance identifier may be added to the packet, and the field may be referred to as, for example, an MFI-ID field. The following respectively describes two cases for the ISIS packet and the OSPF packet.

For the ISIS packet, a new packet type may be defined, and the packet type is a packet that carries and includes an MFI-ID field in the packet. For example, the ISIS packet may carry indication information, and the indication information indicates that the ISIS packet carries the flooding instance identifier. The indication information may be carried in a PDU type field of the ISIS packet. Specific locations of MFI-ID fields that carry flooding instance identifiers in different ISIS packets are different.

For example, as shown in FIG. 8, an MFI-ID field may be located in an LSP ID field of an LSP. An original LSP ID field includes a source ID field, a pseudonode ID, and an LSP slice number (LSP Number). An MFI-ID field is added to a modified LSP ID field. The added MFI-ID field may occupy one byte, and carries a flooding instance identifier. An LSP including the modified LSP ID field is also a new LSP. A value of a PDU type field included in the new LSP may include indication information. The indication information indicates that the LSP packet is an LSP packet carrying an MFI-ID field. The value of the PDU type field is not limited in this embodiment, and may be designed by persons skilled in the art. For example, the value is TBA1.

As shown in FIG. 9, an MFI-ID field may be located after a source ID field of a PSNP, or may be at another location in the PSNP. This is not limited in this embodiment. A value of a PDU type field of a new PSNP packet carrying the MFI-ID field includes indication information, indicating that the PSNP packet is a PSNP packet carrying an MFI-ID field. The value of the PDU type field is not limited in this embodiment, and may be designed by persons skilled in the art. For example, the value is TBA2.

As shown in FIG. 10, an MFI-ID field may be located after an end LSP ID field of a CSNP, and is used to indicate that all LSPs within a range from a start LSP ID to an end LSP ID belong to a flooding instance corresponding to the MFI-ID. Further, the MFI-ID field may alternatively be at another location in the CSNP. This is not limited in this embodiment. A value of a PDU type field of a new CSNP packet carrying the MFI-ID field includes indication information, indicating that the CSNP packet is a CSNP packet carrying an MFI-ID field. The value of the PDU type field is not limited in this embodiment, and may be designed by persons skilled in the art. For example, the value is TBA3.

For an OSPF packet, an MFI-ID field carrying a flooding instance identifier may be added to an OSPF packet header to form a new OSPF packet.

Figure 11:
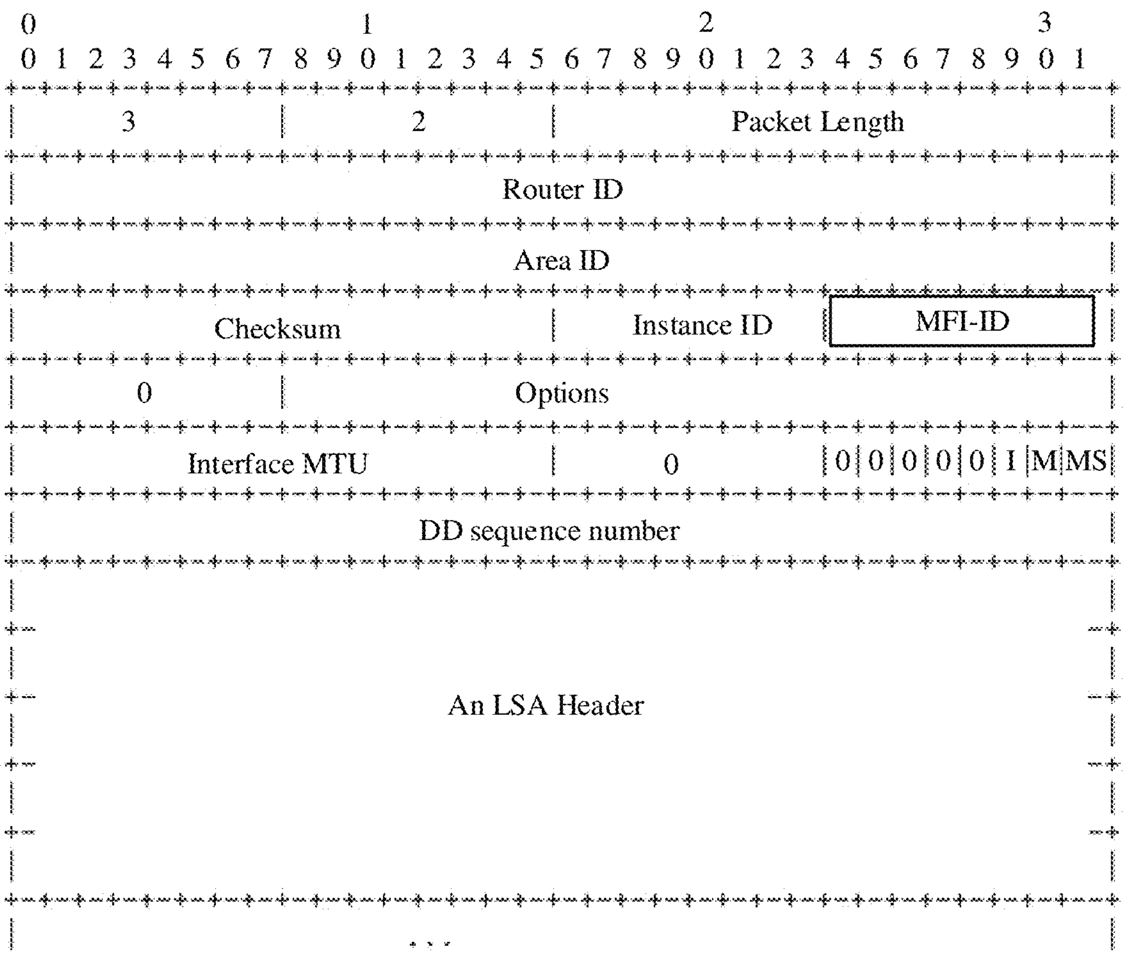
FIG. 11 is a schematic diagram of a format of a packet header of a DD packet according to an embodiment.

For example, FIG. 11 is a schematic diagram of a format of a packet header of a DD packet. The packet header of the DD packet includes the following fields: a packet length, a router identifier (Router ID), an area identifier (Area ID), a checksum, an instance identifier (Instance ID), options, an interface maximum transmission unit (Interface MTU), a DD sequence number (sequence number), and an LSA header. In addition to the foregoing fields, the packet header of the DD packet further includes an MFI-ID field, and the field carries a flooding instance identifier.

Figure 12:
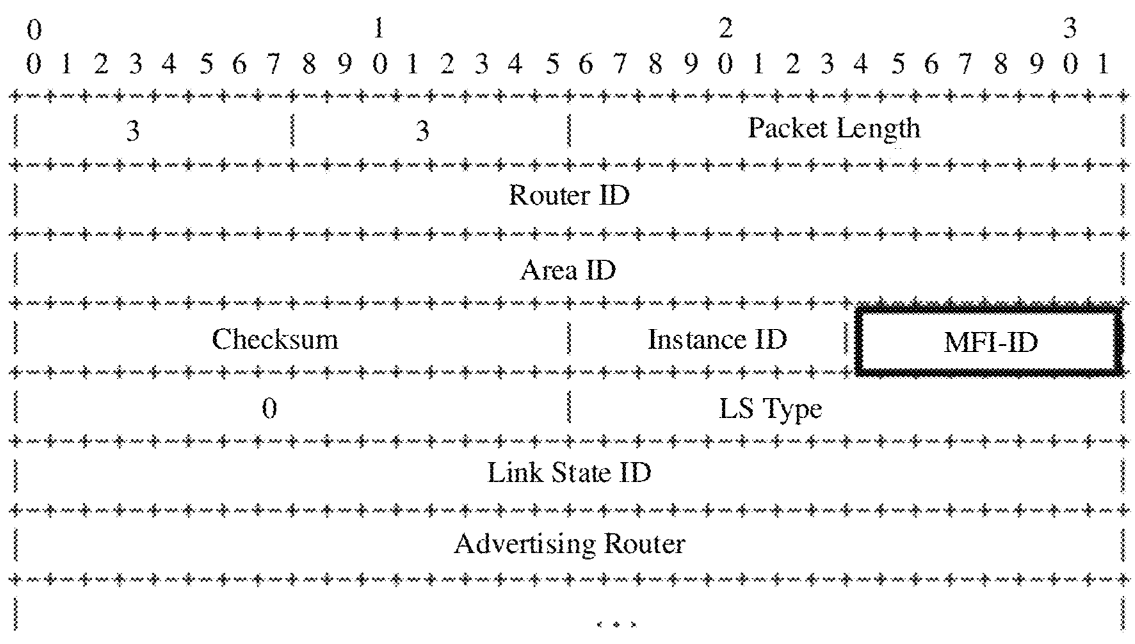
FIG. 12 is a schematic diagram of a format of a packet header of an LSR packet according to an embodiment.

FIG. 12 is a schematic diagram of a format of a packet header of an LSR packet. The packet header of the LSR packet includes the following fields: Packet Length, Router ID, Area ID, Checksum, Instance ID, a link-state advertisement (LSA) type (LSA type), a link state identifier (Link State ID), and an advertisement router. In addition to the foregoing fields, the packet header of the LSR packet further includes an MFI-ID field, and the field carries a flooding instance identifier.

Figure 13:
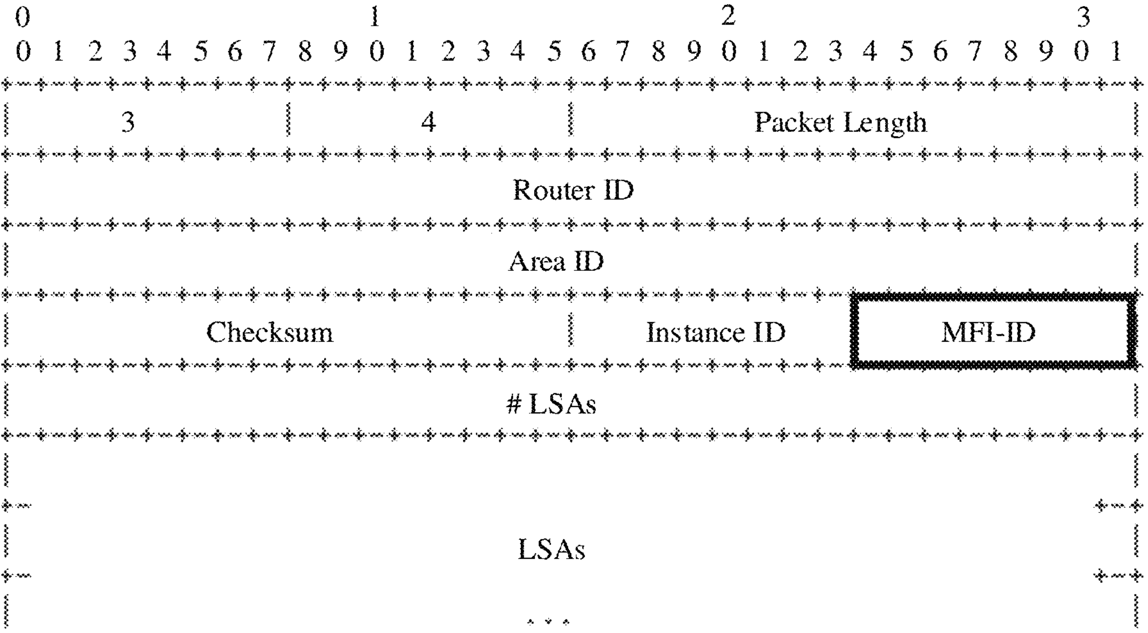
FIG. 13 is a schematic diagram of a format of a packet header of an LSU packet according to an embodiment.

FIG. 13 is a schematic diagram of a format of a packet header of an LSU packet. The packet header of the LSU packet includes the following fields: Packet Length, Router ID, Area ID, Checksum, Instance ID, #LSAs, and LSAs. In addition to the foregoing fields, the packet header of the LSU packet further includes an MFI-ID field, and the field carries a flooding instance identifier.

Figure 14:
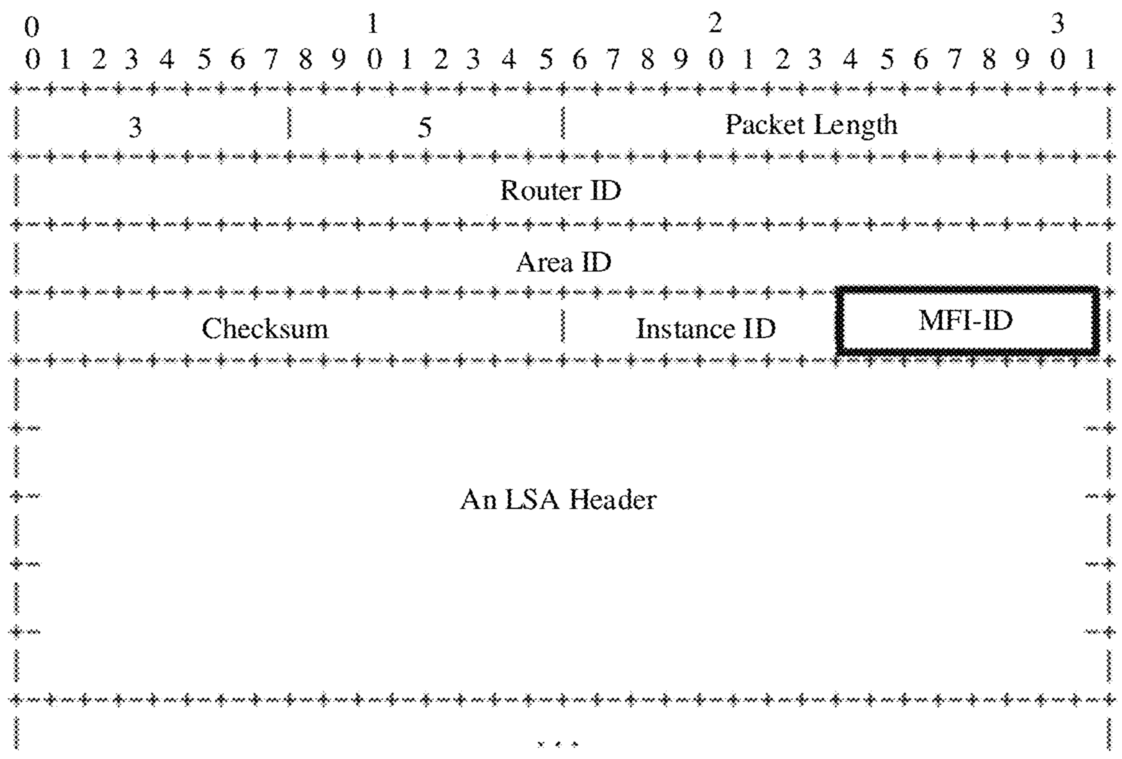
FIG. 14 is a schematic diagram of a format of a packet header of an LSAck packet according to an embodiment.

FIG. 14 is a schematic diagram of a format of a packet header of an LSAck packet. The packet header of the LSAck packet includes the following fields: Packet Length, Router ID, Area ID, Checksum, Instance ID, and LSA Header. In addition to the foregoing fields, the packet header of the LSAck packet further includes an MFI-ID field, and the field carries a flooding instance identifier.

In addition to the foregoing possible implementations, the flooding instance identifier may be carried in another location in the ISIS packet or the OSPF packet, or may be carried in a packet other than the ISIS packet or the OSPF packet. This is not limited in this embodiment.

S103: A second network device receives one or more packets from the first network device. Each of the plurality of packets carries a flooding instance identifier and flooding information that correspond to the packet.

After obtaining the plurality of packets, the first network device may send the plurality of packets. In this embodiment, the first network device may send the plurality of packets to one network device, or may send the plurality of packets to different network devices. As one receiver of the plurality of packets, the second network device receives one or more of the plurality of packets sent by the first network device. When the second network device receives a plurality of packets (all or some of the packets sent by the first network device), flooding instances corresponding to flooding instance identifiers carried in the packets belong to a same IGP instance.

Before sending a packet to the second network device, the first network device may first establish a neighbor relationship with the second network device by sending a hello packet to the second network device. After the neighbor relationship is established, the first network device may send the one or more packets to the second network device based on the neighbor relationship. Because the flooding information carried in the plurality of packets belongs to one IGP instance, only one neighbor relationship needs to be established with the second network device.

As described above, the packets sent by the first network device may be ISIS packets or OSPF packets. For different types of packets, neighbor relationships need to be established in different manners.

For example, for an ISIS packet, network devices establish and maintain a neighbor relationship by sending an ISIS hello (IIH) packet. Currently, the ISIS supports a point-to-point network and a broadcast network.

For the point-to-point network, in an example of establishing a neighbor relationship between the first network device and the second network device, the first network device may send an IIH packet to the second network device, and after receiving the IIH packet, the second network device verifies validity of the IIH packet. If the verification succeeds, it indicates that a neighbor relationship is established between the first network device and the second network device. During implementation, the second network device may set a neighbor state between the second network device and the first network device to up. How the second network device verifies validity of the IIH packet is not limited in this embodiment, and may be designed by persons skilled in the art based on an actual case. For example, the second network device may determine whether an internet protocol (IP) address of the first network device that is carried in the IIH packet and an IP address of the second network device are in a same network segment. If the IP addresses are in a same network segment, it is considered that the IIH packet is valid. If no, it is considered that the IIH packet is invalid, and establishment of a neighbor relationship between the first network device and the second network device fails.

For the broadcast network, in an example of establishing a neighbor relationship between the first network device and the second network device, the first network device and the second network device may send an IIH packet 1 to each other, where a destination address of the IIH packet 1 is empty. After receiving the IIH packet 1 sent by the second network device, the first network device sends an IIH packet 2 to the second network device, where a destination address carried in the IIH packet 2 is an IP address of the second network device. After receiving the IIH packet 2 from the first network device, the second network device may set a neighbor state between the first network device and the second network device to up.

S104: The second network device stores the flooding information corresponding to the flooding instance identifier.

After receiving the packet from the first network device, the second network device may store the flooding instance identifier and the corresponding flooding information that are carried in the packet.

For example, the second network device may store one or more LSDBs, where the LSDB is used to store flooding information. After receiving the packet from the first network device, the second network device may search for a corresponding LSDB based on the flooding instance identifier carried in the packet (if the second network device stores one LSDB, a corresponding sub-LSDB may be searched for based on the flooding instance identifier). If a corresponding LSDB can be found, the LSDB is updated by using the flooding information in the packet. If no corresponding LSDB can be found, a new LSDB is established, the flooding information in the packet is stored in the LSDB, and a correspondence between the LSDB and the flooding instance identifier is stored.

For example, the second network device stores an LSDB 0, an LSDB 1, and an LSDB 2, where the LSDB 0 is used to store flooding information corresponding to an MTI-ID 0, the LSDB 1 is used to store flooding information corresponding to an MTI-ID 1, and the LSDB 2 is used to store flooding information corresponding to an MTI-ID 2.

In addition, to identify a network device from which the flooding information comes in the LSDB, the packet may further carry an identifier of the network device, for example, a router identifier (router ID). The router identifier may be configured as an IP address of a loopback interface. After receiving the packet, the second network device stores a correspondence between the identifier of the network device, the flooding instance identifier, and the flooding information.

In this embodiment, the first network device divides one IGP instance into a plurality of flooding instances, and sends, through a plurality of packets, flooding information corresponding to the plurality of flooding instances. Compared with a conventional solution in which flooding information of one IGP instance is sent as a whole, in this embodiment, the flooding information of the one IGP instance can be flexibly managed, to adapt to flooding requirements in different scenarios, improve flooding efficiency, save network resources, and improve flooding information processing efficiency.

For example, flooding information of a plurality of flooding instances that belong to one IGP instance may be sent to different network devices by using different packets, to implement on-demand transmission and save network resources.

For another example, flooding information of a plurality of flooding instances that belong to one IGP instance may be flooded based on different flooding parameters, to implement resource isolation. For example, a transmission interval for flooding information of a flooding instance with a low requirement for LSDB update frequency may be long, and a transmission interval for flooding information of a flooding instance with a high requirement for LSDB update frequency may be short, or the like.

For another example, flooding information of a plurality of flooding instances that belong to one IGP instance may be sent, received, or updated through a plurality of different processes, and each process corresponds to a unique flooding instance, to enhance resource isolation, implement parallel processing, and improve flooding efficiency and flooding information processing efficiency.

In addition, for an LSP packet, as described above, an MFI-ID field may be located in an LSP ID field. An original LSP ID field includes an LSP Number field, and a value range of the field is 0 to 255. For example, a conventional LSP supports a maximum of 256 different types of LSPs. However, because the MFI-ID field is added to the LSP ID field, it means that a maximum of 256×n types of LSPs can be sent in this embodiment, to meet more application requirements, where n is a quantity of possible values of the MFI-ID field, that is, n is an integer greater than 1. For example, a value of the LSP ID field and a value of the MFI-ID field uniquely identify an LSP, and a network device may uniquely determine a process based on the LSP ID and the MFI-ID. Additionally, in some examples, each MFI-ID may correspond to one LSP ID. In this way, a network device can uniquely determine a process based on the LSP ID. The latter is applicable to a network device that does not support an MFI-ID.

Considering a scenario of networking between a device that supports an MFI and a device that does not support an MFI, the following two modes may be available.

Mode 1: For networking between devices that do not support or partially support an MFI, all flooding instances that belong to one IGP instance share an LSP number space. A total quantity of LSPs corresponding to all the flooding instances cannot exceed 256.

Mode 2: For networking between devices that support an MFI, different flooding instances have separate LSP number spaces. A quantity of LSPs corresponding to each flooding instance can reach 256. An LSP is uniquely identified by a combination of an LSP ID and an MFI-ID.

In this embodiment, to reduce flooding traffic and reduce network resources consumed by flooding, routing information of a network device may be first flooded on an entire network, and then the network device calculates a shortest path tree (SPT) with the network device as a root node, and floods other flooding information based on the shortest path tree. The shortest path tree describes a shortest path from the root node to another node.

The first network device is used as an example. The first network device may flood a first packet to a neighboring network device (for example, the second network device) of the first network device. The first packet includes a first flooding instance identifier and flooding information, and the flooding information corresponding to the first flooding instance identifier includes routing information. The routing information may be routing information of the first network device, or may be routing information of another network device that is learned by the first network device. After receiving the first packet, the neighboring network device (for example, the second network device) also floods the first packet to a neighboring network device of the neighboring network device, to flood the first packet on the entire network. Another network device in the network architecture also performs a step similar to that performed by the first network device. Therefore, the first network device may obtain routing information of the another network device in the network architecture.

Then the first network device may calculate, based on the obtained routing information, a shortest path tree with the first network device as a root node, and send a second packet to a next-hop network device (for example, the second network device) in the shortest path tree. The second packet includes a second flooding instance identifier and flooding information, and the flooding information corresponding to the second flooding instance identifier includes one or more types of non-routing information. The next-hop network device may perform a step similar to that performed by the first network device, and so on, to reduce flooding traffic while implementing network-wide flooding.

Figure 15:
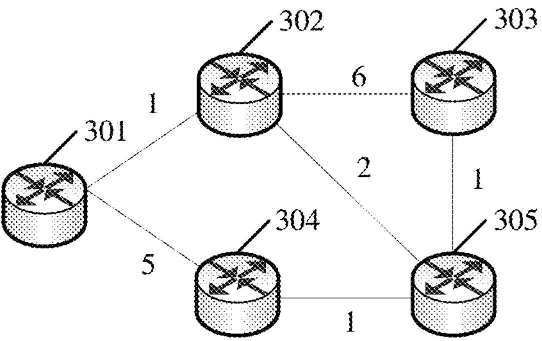
FIG. 15 is a schematic diagram of a network architecture according to an embodiment.

The following provides descriptions with reference to FIG. 15. FIG. 15 is a schematic diagram of a network architecture according to an embodiment. In FIG. 15, the network architecture includes a network device 301, a network device 302, a network device 303, a network device 304, and a network device 305. The network device 301 is connected to the network device 302 and the network device 304. The network device 302 is connected to the network device 303 and the network device 305. The network device 305 is connected to the network device 303 and the network device 304.

The network device 301 sends a packet 1 to the network device 302 and the network device 304, where the packet carries an MTI-ID 0 and routing information of the network device 301, so that the network device 302 and the network device 304 flood the packet 1 to the network device 303 and the network device 305. In addition, the network device 301 receives a packet that comes from another network device and that carries routing information of the another network device. The routing information includes a prefix and a link cost value between two adjacent network devices.

The network device 301 determines, based on the obtained routing information, that a cost value between the network device 301 and the network device 302 is 1, a cost value between the network device 301 and the network device 304 is 5, a cost value between the network device 302 and the network device 303 is 6, a cost value between the network device 302 and the network device 305 is 2, a cost value between the network device 304 and the network device 305 is 1, and a cost value between the network device 303 and the network device 305 is 1.

Figure 16:
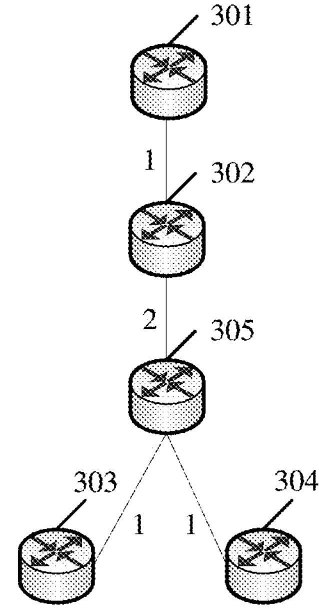
FIG. 16 is a schematic diagram of a shortest path tree according to an embodiment.

Then, as shown in FIG. 16, the network device 301 may obtain, based on the foregoing cost values, a shortest path tree with the network device 301 as a root node. The shortest path tree is the network device 301—the network device 302—the network device 305—the network device 303—the network device 304. That is, a next-hop network device of the root node, such as the network device 301, in the shortest path tree is the network device 302.

The network device 301 may send a packet 2 to the network device 302 based on the shortest path tree, where the packet 2 carries an MTI-ID 1 and non-routing information (for example, application program information). After receiving the packet 2, the network device 302 may send the packet 2 to a next-hop network device based on a shortest path tree with the network device 302 as a root node, to implement network-wide flooding and reduce flooding traffic.

As described above, flooding information of an IGP instance may not be flooded to all network devices, but only to a network device as required, to save network resources. Therefore, to achieve this objective, each network device in the network architecture may predetermine a network topology in which flooding information needs to be flooded, and add, to a to-be-sent packet, a flooding topology identifier used to identify the network topology, so that a network device receiving the packet can send the packet to a corresponding network device based on the flooding topology identifier.

The first network device and the second network device are used as examples. The first network device may add a flooding topology identifier to a packet to be sent to the second network device. After receiving the flooding topology identifier, the second network device searches for a next-hop network device corresponding to the flooding topology identifier, and sends the packet to the next-hop network device, to flooding the packet in a specific network topology.

The network architecture shown in FIG. 15 is used as an example. It is assumed that flooding information that is sent by the network device 301 and that corresponds to the MTI-ID 1 needs to be received by the network device 302 and the network device 305. In this case, the network device 301 may obtain the packet 1, where the packet carries a flood topology identifier 1, the MTI-ID 1, and the flooding information. A network topology corresponding to the flooding topology identifier 1 is the network device 301—the network device 302—the network device 305. If the network device 301 determines that a next-hop network device corresponding to the flooding topology identifier 1 is the network device 302, the network device 301 sends the packet 1 to the network device 302. After receiving the packet 1, the network device 302 determines, based on the flooding topology identifier 1 in the packet 1, that a next-hop network device is the network device 305. Therefore, the network device 302 may send the packet 1 to the network device 305. After receiving the packet 1, the network device 305 determines that no correspondence between the flooding topology identifier 1 and a next-hop network device is stored, or finds that a next-hop network device corresponding to the flooding topology identifier 1 is null (null), and therefore does not continue to flood the packet 1 to another device. In this way, the packet 1 can be flooded only in the network topology of the network device 301—the network device 302—the network device 305, without being flooded to the network device 303 or the network device 304, to save network resources.

In this embodiment, a manner in which a flooding topology identifier is carried in a packet is similar to a manner in which a flooding instance identifier is carried in a packet. For example, a flooding topology identifier may be carried in an existing field of a packet in a format of a TLV, or a new field is added to the packet to obtain a new type of packet.

When the flooding topology identifier is carried in the packet in a format of a TLV, the TLV and a TLV carrying a flooding instance identifier may be one TLV. For example, a V field of the TLV includes both the flooding instance identifier and the flooding topology identifier. Alternatively, the TLV carrying the flooding topology identifier is a TLV different from the TLV carrying the flooding instance identifier. In the latter case, if the packet is an ISIS packet, the TLV field carrying the flooding topology identifier may be located in variable length fields of the ISIS packet; or if the packet is an OSPF packet, the TLV field carrying the flooding topology identifier may be located in a data part of the OSPF packet.

When the flooding topology identifier is carried in a new type of packet in a manner of adding a field, the added field may be referred to as, for example, an instance-specific flooding topology identifier (IFTID) field. Locations of the IFTID field in the ISIS packet and the OSPF packet are similar to locations of the MTI-ID field. Details are not described herein again.

In addition, in this embodiment, LSDBs corresponding to one flooding instance are distinguished by different flooding topology identifiers. For example, when storing flooding information, the second network device determines a corresponding LSDB based on a flooding instance identifier and a flooding topology identifier, and stores the flooding information in the LSDB.

To improve flooding information processing efficiency, flooding information in different flooding topologies corresponding to one flooding instance may be sent, received, and updated through different processes. For example, a process 1 is used to update flooding information in a flooding topology 1 of a flooding instance 1, a process 2 is used to update flooding information in a flooding topology 2 of the flooding instance 1, and a process 3 is used to update flooding information in a flooding topology 3 of a flooding instance 0.

Figure 17:
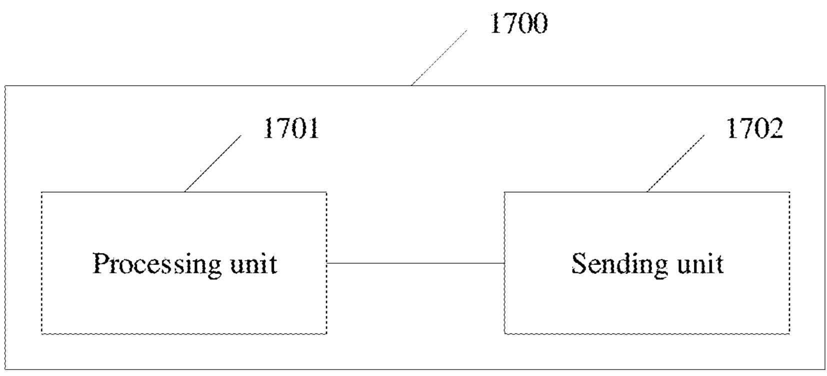
FIG. 17 is a schematic diagram of a structure of a first device according to an embodiment.

FIG. 17 is a schematic diagram of a possible structure the first network device in the foregoing embodiments. The device 1700 can implement functions of the first network device in the example shown in FIG. 3. As shown in FIG. 17, the network device 1700 includes a processing unit 1701 and a sending unit 1702. These units may perform corresponding functions of the first network device in the foregoing method examples. The processing unit 1701 is configured to enable the device 1700 to perform S101 in FIG. 3. The sending unit 1702 is configured to enable the network device 1700 to perform S102 in FIG. 3. For example, the processing unit 1701 is configured to obtain a flooding information set, where the flooding information set includes flooding information corresponding to each of a plurality of flooding instances, and the plurality of flooding instances belong to one interior gateway protocol IGP instance; and the sending unit 1702 is configured to send a plurality of packets, where each of the plurality of packets carries a corresponding flooding instance identifier and corresponding flooding information, and the flooding instance identifier is used to identify a flooding instance. For a specific execution process, refer to detailed descriptions of corresponding steps in the embodiment shown in FIG. 3. Details are not described herein again.

Figure 18:
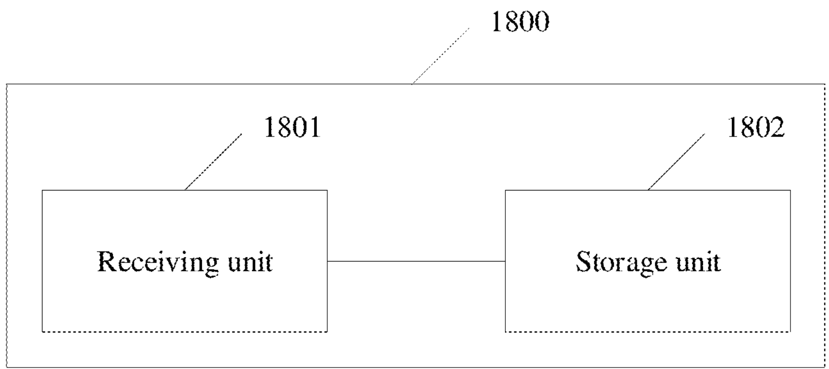
FIG. 18 is a schematic diagram of a structure of a second device according to an embodiment.

FIG. 18 is a schematic diagram of a possible structure the second network device in the foregoing embodiments. The device 1800 can implement functions of the second network device in the example shown in FIG. 3. As shown in FIG. 18, the network device 1800 includes a receiving unit 1801 and a storage unit 1802. These units may perform corresponding functions of the second network device in the foregoing method examples. The receiving unit 1801 is configured to enable the device 1800 to perform S103 in FIG. 3. The storage unit 1802 is configured to enable the network device 1800 to perform S104 in FIG. 3. For example, the receiving unit 1801 is configured to receive a plurality of packets from a first network device, where each of the plurality of packets carries a flooding instance identifier and flooding information that correspond to the packet, and a plurality of flooding instances corresponding to the plurality of packets belong to one interior gateway protocol IGP instance; and the storage unit 1802 is configured to store the flooding information corresponding to the flooding instance identifier. For a specific execution process, refer to detailed descriptions of corresponding steps in the embodiment shown in FIG. 3. Details are not described herein again.

It should be noted that, in the embodiments, division into the units is an example, and is merely logical function division. During actual implementation, another division manner may be used. Functional units in embodiments may be integrated into one processing unit, or each of the units may exist alone physically, or two or more units may be integrated into one unit. For example, in the foregoing embodiments, an obtaining unit and the processing unit may be a same unit or different units. The integrated unit may be implemented in a form of hardware, or may be implemented in a form of a software functional unit.

Figure 19:
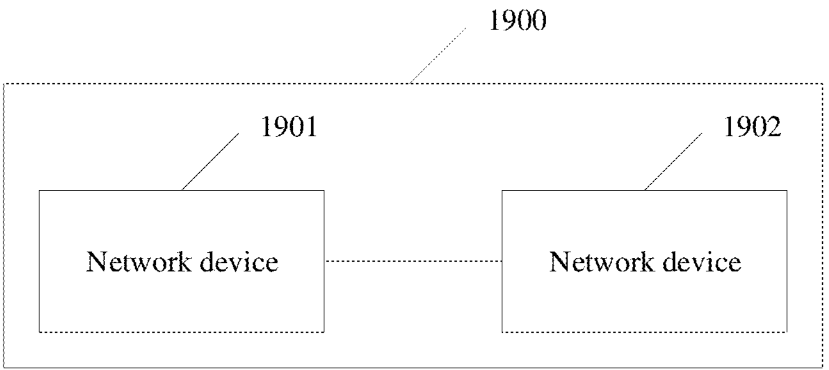
FIG. 19 is a schematic diagram of a structure of a network system according to an embodiment.

As shown in FIG. 19, an embodiment provides a network system 1900. The system 1900 is configured to implement the information flooding method in the foregoing method embodiments. The system 1900 includes a network device 1901 and a network device 1902. The device 1901 can implement functions of the first network device in the embodiment shown in FIG. 3. The device 1902 can implement functions of the second network device in the embodiment shown in FIG. 3. For a specific execution process, refer to detailed descriptions of corresponding steps in the embodiment shown in FIG. 3. Details are not described herein again.

Figure 20:
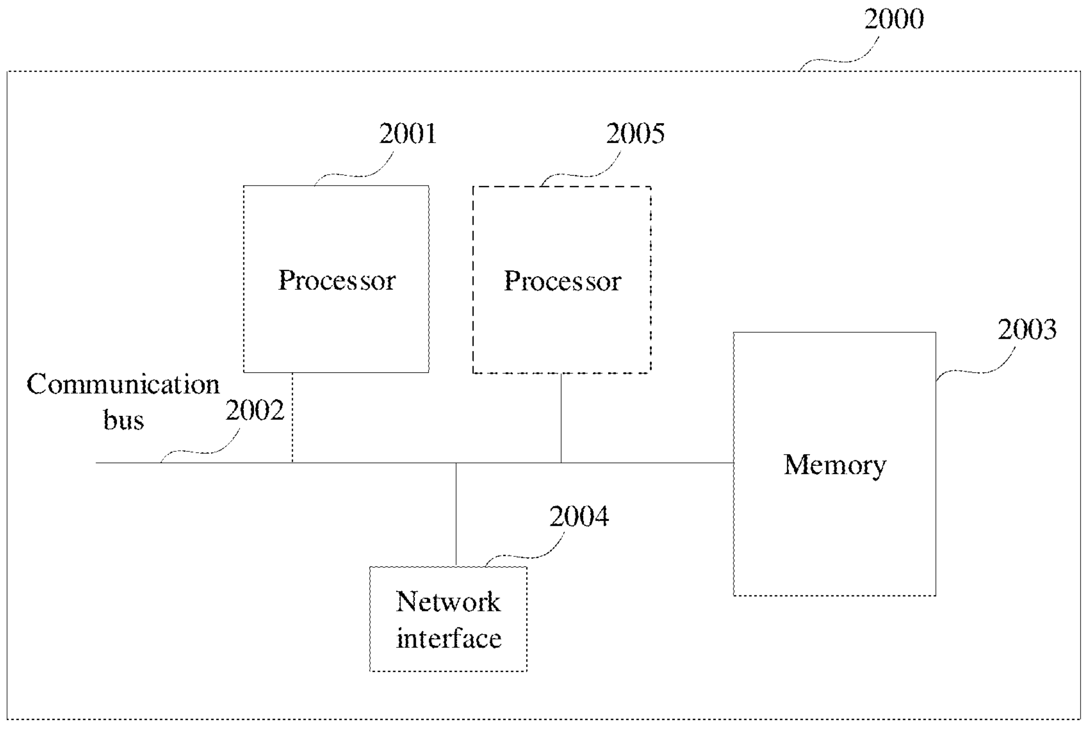
FIG. 20 is a schematic diagram of a structure of a device according to an embodiment.

FIG. 20 is a schematic diagram of a structure of a device 2000 according to an embodiment. The network device 1700 in FIG. 17 and the network device 1800 in FIG. 18 may be implemented by using the device shown in FIG. 20. As shown in FIG. 20, the device 2000 includes at least one processor 2001, a communication bus 2002, and at least one network interface 2004. Optionally, the device 2000 may further include a memory 2003.

The processor 2001 may be a general-purpose central processing unit (CPU), an application-specific integrated circuit (ASIC), or one or more integrated circuits (IC) for controlling execution of programs of solutions of the embodiments. The processor may be configured to process a packet, to implement the packet forwarding method and the packet processing method provided in the embodiments. For example, when the first network device in FIG. 3 is implemented by using the device shown in FIG. 20, the processor may be configured to obtain a flooding information set, and send a plurality of packets, where each of the plurality of packets carries a corresponding flooding instance identifier and corresponding flooding information. For another example, when the second network device in FIG. 3 is implemented by using the device shown in FIG. 20, the processor may be configured to receive a plurality of packets from a first network device, and store flooding information corresponding to a flooding instance identifier. For specific function implementation, refer to the processing part of the second network device in the method embodiments.

The communication bus 2002 is configured to transmit information between the processor 2001, the network interface 2004, and the memory 2003.

The memory 2003 may be a read-only memory (ROM) or another type of static storage device capable of storing static information and instructions, or the memory 2003 may be a random access memory (RAM) or another type of dynamic storage device capable of storing information and instructions, or may be a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this does not constitute a limitation herein. The memory 2003 may exist independently, and is connected to the processor 2001 through the communication bus 2002. Alternatively, the memory 2003 may be integrated with the processor 2001.

Optionally, the memory 2003 is configured to store program code or instructions for performing solutions of this embodiment, and the processor 2001 controls execution of the program code or the instructions. The processor 2001 is configured to execute the program code or the instructions stored in the memory 2003. The program code may include one or more software modules. Optionally, the processor 2001 may alternatively store program code or instructions for performing solutions of the embodiments. In this case, the processor 2001 does not need to read the program code or the instructions from the memory 2003.

The network interface 2004 may be an apparatus such as a transceiver, and is configured to communicate with another device or a communication network. The communication network may be Ethernet, a radio access network (RAN), a wireless local area network (WLAN), or the like. In this embodiment, the network interface 2004 may be configured to receive a packet sent by another node in a segment routing network, or may send a packet to another node in a segment routing network. The network interface 2004 may be an Ethernet interface, a fast Ethernet (FE) interface, a gigabit Ethernet (GE) interface, or the like.

During implementation, in an embodiment, the device 2000 may include a plurality of processors, for example, the processor 2001 and a processor 2005 shown in FIG. 20. Each of the processors may be a single-core processor, or may be a multi-core processor. The processor herein may be one or more devices, circuits, and/or processing cores for processing data (for example, computer program instructions).

Figure 21:
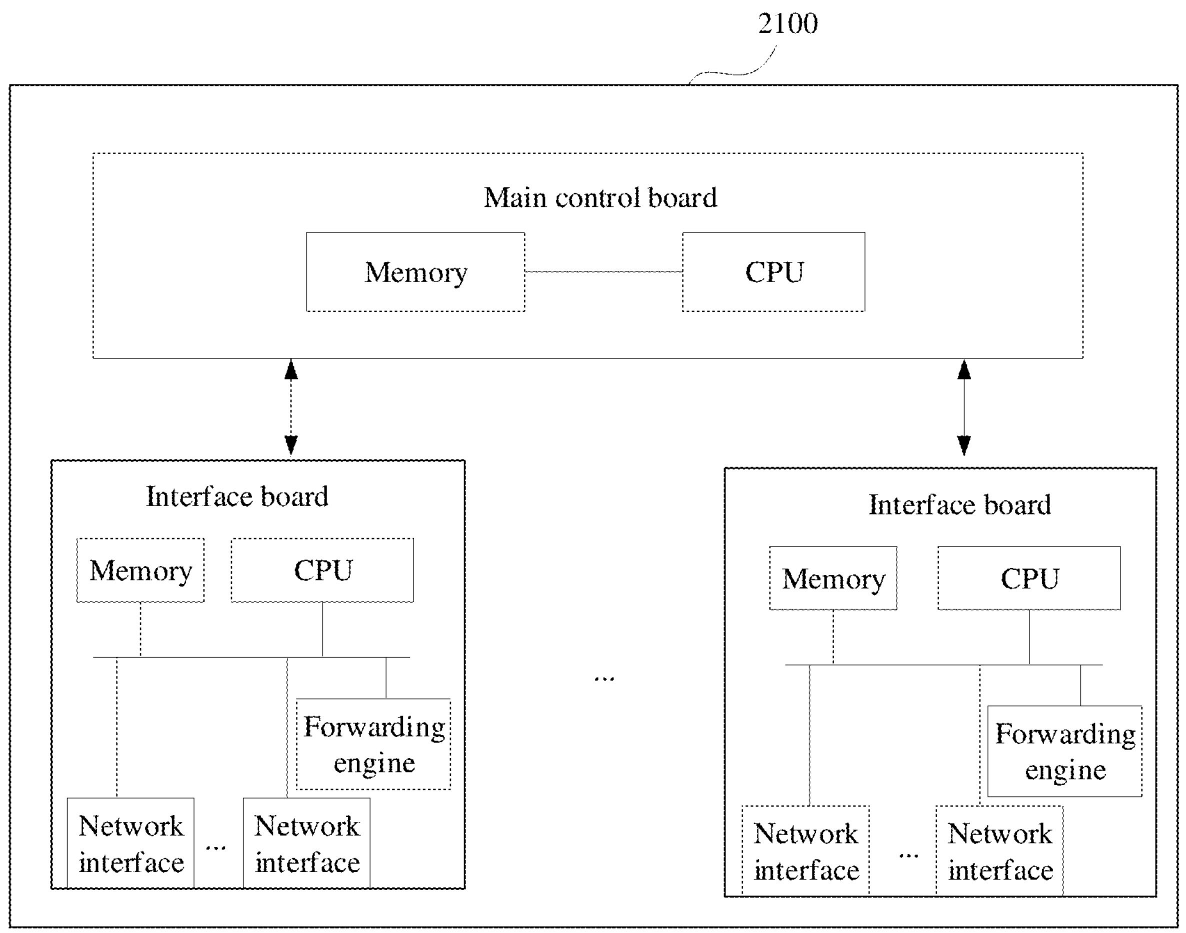
FIG. 21 is a schematic diagram of a structure of a device according to an embodiment.

FIG. 21 is a schematic diagram of a structure of a device 2100 according to an embodiment. The first network device and the second network device in FIG. 3 may be implemented by using the device shown in FIG. 21. As shown in the schematic diagram of the structure of the device in FIG. 21, the device 2100 includes a main control board and one or more interface boards. The main control board is communicatively connected to the interface board. The main control board is also referred to as a main processing unit (MPU) or a route processor card. The main control board includes a CPU and a memory. The main control board controls and manages components in the device 2100, and includes route calculation, device management, and maintenance functions. The interface board is also referred to as a line processing unit (LPU) or a line card, and is configured to receive and send a packet. In some embodiments, the main control board communicates with the interface board through a bus, or interface boards communicate with each other through a bus. In some embodiments, interface boards communicate with each other through a switching board. In this case, the device 2100 also includes a switching board. The switching board is communicatively connected to the main control board and the interface board. The switching board is configured to forward data between interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding table stored in the memory. If a destination address of the received packet is an IP address of the device 2100, the packet is sent to the CPU of the main control board or the interface board for processing. If the destination address of the received packet is not the IP address of the device 2100, the forwarding table is searched based on the destination address, and if a next hop and an outbound interface corresponding to the destination address are found in the forwarding table, the packet is forwarded to the outbound interface corresponding to the destination address. The forwarding engine may be a network processor (NP). The interface card, also referred to as a subcard, may be installed on the interface board. The interface card converts an optical or electrical signal into a data frame, checks validity of the data frame, and forwards the data frame to the forwarding engine for processing or to the CPU of the interface board. In some embodiments, the CPU may alternatively perform a function of a forwarding engine. For example, software forwarding is implemented based on a general-purpose CPU, so that no forwarding engine is required in the interface board. In some embodiments, the forwarding engine may be implemented by using an ASIC or a field programmable gate array (FPGA). In some embodiments, the memory that stores the forwarding table may alternatively be integrated into the forwarding engine as a part of the forwarding engine.

An embodiment further provides a chip system, including a processor. The processor is coupled to a memory. The memory is configured to store a program or instructions. When the program or the instructions are executed by the processor, the chip system is enabled to implement the method for the first network device or the second network device in the embodiment shown in FIG. 3.

Optionally, there may be one or more processors in the chip system. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may also be one or more memories in the chip system. The memory may be integrated with the processor, or may be disposed separately from the processor. This is not limited. For example, the memory may be a non-transitory processor, for example, a read-only memory ROM. The memory and the processor may be integrated into one chip, or may be separately disposed on different chips. A type of the memory and a manner of disposing the memory and the processor are not limited.

For example, the chip system may be an FPGA, an ASIC, a system on chip (SoC), a CPU, an NP, a digital signal processor (DSP), a microcontroller unit (MCU), a programmable logic device (PLD), or another integrated chip.

It should be understood that the steps in the foregoing method embodiments may be performed by an integrated logic circuit of hardware in a processor or through instructions in a form of software. The steps of the methods with reference to embodiments may be directly performed by a hardware processor, or may be performed by a combination of hardware in a processor and a software module.

An embodiment further provides a computer-readable storage medium, including instructions. When the instructions run on a computer, the computer is enabled to perform the methods in the foregoing embodiments.

In the embodiments and accompanying drawings, the terms “first”, “second”, “third”, “fourth”, and the like are intended to distinguish between similar objects but do not necessarily indicate a specific sequence or order. It should be understood that data used in this way is interchangeable in proper circumstances, so that embodiments described herein can be implemented in an order other than the order illustrated or described herein. In addition, the terms “comprise”, “include”, and any variants thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

In the embodiments, “at least one” means one or more, and “a plurality of” means two or more. “At least one of the following items” or a similar expression thereof indicates any combination of the items, including one of the items or any combination of a plurality of the items. For example, at least one of a, b, or c may indicate a, b, c, a and b, a and c, b and c, or a, b, and c, where a, b, and c may be singular or plural. In the embodiments, it is considered that “A and/or B” includes only A, only B, and both A and B.

It can be clearly understood by persons skilled in the art that, for ease and brevity of description, for a detailed operation process of the foregoing system, apparatus, and unit, reference may be made to a corresponding process in the foregoing method embodiments, and details are not described herein again.

In the several embodiments provided, it should be understood that the system, apparatus, and method may be implemented in other manners. For example, the described apparatus embodiments are merely examples. For example, division into the units is merely logical module division and may be another division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, may be located in one place, or may be distributed on a plurality of network units. Some or all of the units may be obtained according to actual requirements to achieve objectives of solutions of embodiments.

In addition, modules/units in embodiments may be integrated into one processing unit, or each of the units may exist alone physically, or two or more units may be integrated into one unit. The integrated unit may be implemented in a form of hardware, or may be implemented in a form of a software module/unit.

When the integrated unit is implemented in the form of a software module/unit and sold or used as an independent product, the integrated unit may be stored in a computer-readable storage medium. Based on such an understanding, the solutions of the embodiments essentially, or a part contributing to the conventional technology, or all or some of the solutions may be implemented in a form of a software product. The computer software product is stored in a storage medium and includes several instructions for instructing a computer device (which may be a personal computer, a server, a network device, or the like) to perform all or some of the steps of the methods in embodiments. The storage medium includes any medium that can store program code, such as a USB flash drive, a removable hard disk, a read-only memory (ROM), a random access memory (RAM,), a magnetic disk, or an optical disc.

Persons skilled in the art should be aware that, in the foregoing one or more examples, functions may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium suitable for transmitting a computer program from one place to another. The storage medium may be any available medium accessible to a general-purpose or dedicated computer.

Objectives, solutions, and benefits of the embodiments are further described in detail in the foregoing specific implementations. It should be understood that the foregoing descriptions are merely non-limiting embodiments.

The foregoing embodiments are merely intended for describing the solutions, but not for limiting, the embodiments. Although described in detail with reference to the foregoing embodiments, persons of ordinary skill in the art should understand that they may still make modifications to the solutions described in the foregoing embodiments or make equivalent replacements to some features thereof, without departing from the scope of the solutions of embodiments.

What is claimed is:

1. An information flooding method, comprising:

obtaining, by a first network device, a flooding information set, wherein the flooding information set comprises flooding information corresponding to each of a plurality of flooding instances, the plurality of flooding instances are respectively associated with different flooding information, and the plurality of flooding instances belong to one Interior Gateway Protocol (IGP) instance; and sending, by the first network device, a plurality of packets, wherein each of the plurality of packets carries a corresponding flooding instance identifier and corresponding flooding information, and the flooding instance identifier is used to identify a flooding instance.

2. The method according to claim 1, wherein the plurality of flooding instances comprise a first flooding instance, and flooding information of the first flooding instance comprises routing information; and sending, by the first network device, the plurality of packets comprises:

sending, by the first network device, a first packet to a second network device, wherein the first packet comprises a first flooding instance identifier and the routing information, and the second network device is any neighboring network device of the first network device.

3. The method according to claim 2, wherein the routing information comprises one or more of:

a prefix, traffic engineering (TE) information, device capability information, and link information.

4. The method according to claim 1, wherein the plurality of flooding instances comprise a second flooding instance, and flooding information of the second flooding instance comprises non-routing information; and sending, by the first network device, the plurality of packets comprises:

sending, by the first network device, a second packet to a second network device, wherein the second packet comprises a second flooding instance identifier and the non-routing information.

5. The method according to claim 4, wherein the second network device is a next-hop network device in a shortest path tree of the first network device, and the shortest path tree is a shortest path from the first network device as a root node to another network device in a network topology.

6. The method according to claim 5, wherein the shortest path tree of the first network device is generated based on flooding information of a first flooding instance, and the flooding information of the first flooding instance comprises routing information.

7. The method according to claim 6, further comprising:

receiving, by the first network device, a third packet from the second network device, wherein the third packet comprises flooding information of a first flooding instance of the second network device, and the flooding information of the first flooding instance of the second network device comprises routing information of the second network device; and generating, by the first network device, the shortest path tree based on the flooding information of the first flooding instance of the second network device.

8. The method according to claim 4, wherein the non-routing information comprises one or more of the:

application program information, device capability information, and slice information.

9. The method according to claim 1, wherein sending, by the first network device, the plurality of packets comprises:

sending, by the first network device, a hello packet to a second network device, wherein the hello packet is used to establish a neighbor relationship between the first network device and the second network device; and sending, by the first network device, the plurality of packets to the second network device.

10. The method according to claim 1, wherein each of the plurality of flooding instances has a corresponding flooding parameter, and the flooding parameter is used to send a packet of a corresponding flooding instance, and the flooding parameter includes one or more of the following:

a maximum age, a maximum link state protocol data unit (LSP) generation interval, a minimum LSP generation interval, a minimum LSP transmission interval, a complete sequence number packet (CSNP) transmission interval, a partial sequence number packet (PSNP) transmission interval, a retransmission interval, and a refresh timer.

11. An information flooding method, comprising:

receiving, by a second network device, a plurality of packets from a first network device, wherein each of the plurality of packets carries a flooding instance identifier and flooding information that correspond to the packet, a plurality of flooding instances corresponding to the plurality of packets belong to one Interior Gateway Protocol (IGP) instance, and the plurality of flooding instances are respectively associated with different flooding information; and storing, by the second network device, the flooding information corresponding to the flooding instance identifier.

12. The method according to claim 11, wherein storing, by the second network device, the flooding information corresponding to the flooding instance identifier comprises:

updating, by the second network device based on the flooding information, a link state database corresponding to the flooding instance identifier.

13. The method according to claim 12, wherein updating, by the second network device based on the flooding information, the link state database corresponding to the flooding instance identifier comprises:

updating, by the second network device through an update process corresponding to the flooding instance identifier, the flooding information into a link state database corresponding to the update process.

14. The method according to claim 11, wherein the plurality of packets comprise a first packet, the first packet comprises a first flooding instance identifier and first flooding information, and the first flooding information comprises routing information; and the method further comprises:

sending, by the second network device, the first packet to a third network device, wherein the third network device is any neighboring network device of the second network device other than the first network device.

15. The method according to claim 14, wherein the routing information comprises one or more of:

a prefix, traffic engineering (TE) information, device capability information, and link information.

16. The method according to claim 11, wherein the plurality of packets comprise a second packet, the second packet comprises a second flooding instance identifier and second flooding information, and the second flooding information comprises non-routing information; and the method further comprises:

sending, by the second network device, the second packet to a third network device.

17. A network device, applied to a network system comprising a plurality of network devices, wherein the plurality of network devices comprise a first network device, the network device is the first network device, and the network device comprises at least one processor, the at least one processor is coupled to at least one memory, and the at least one processor is configured to execute a computer program or instructions stored in the at least one memory, to cause the network device to:

obtain a flooding information set, wherein the flooding information set comprises flooding information corresponding to each of a plurality of flooding instances, the plurality of flooding instances are respectively associated with different flooding information, and the plurality of flooding instances belong to one Interior Gateway Protocol (IGP) instance; and send a plurality of packets, wherein each of the plurality of packets carries a corresponding flooding instance identifier and corresponding flooding information, and the flooding instance identifier is used to identify a flooding instance.

18. The network device according to claim 17, wherein the plurality of flooding instances comprise a first flooding instance, and flooding information of the first flooding instance comprises routing information; and the at least one processor is configured to execute the computer program or instructions stored in the at least one memory, to cause the network device to: send a first packet to a second network device, wherein the first packet comprises a first flooding instance identifier and the routing information, and the second network device is any neighboring network device of the first network device.

19. The network device according to claim 17, wherein each of the plurality of flooding instances has a corresponding flooding parameter, the flooding parameter is used to send a packet of a corresponding flooding instance, and the flooding parameter includes one or more of the following:

a maximum age, a maximum link state protocol data unit (LSP) generation interval, a minimum LSP generation interval, a minimum LSP transmission interval, a complete sequence number packet (CSNP) transmission interval, a partial sequence number packet (PSNP) transmission interval, a retransmission interval, and a refresh timer.

* * * * *